Dec. 15, 1953   J. BLACK ET AL   2,662,632
CONTAINER-ALIGNING CONVEYER APPARATUS
Filed June 25, 1948
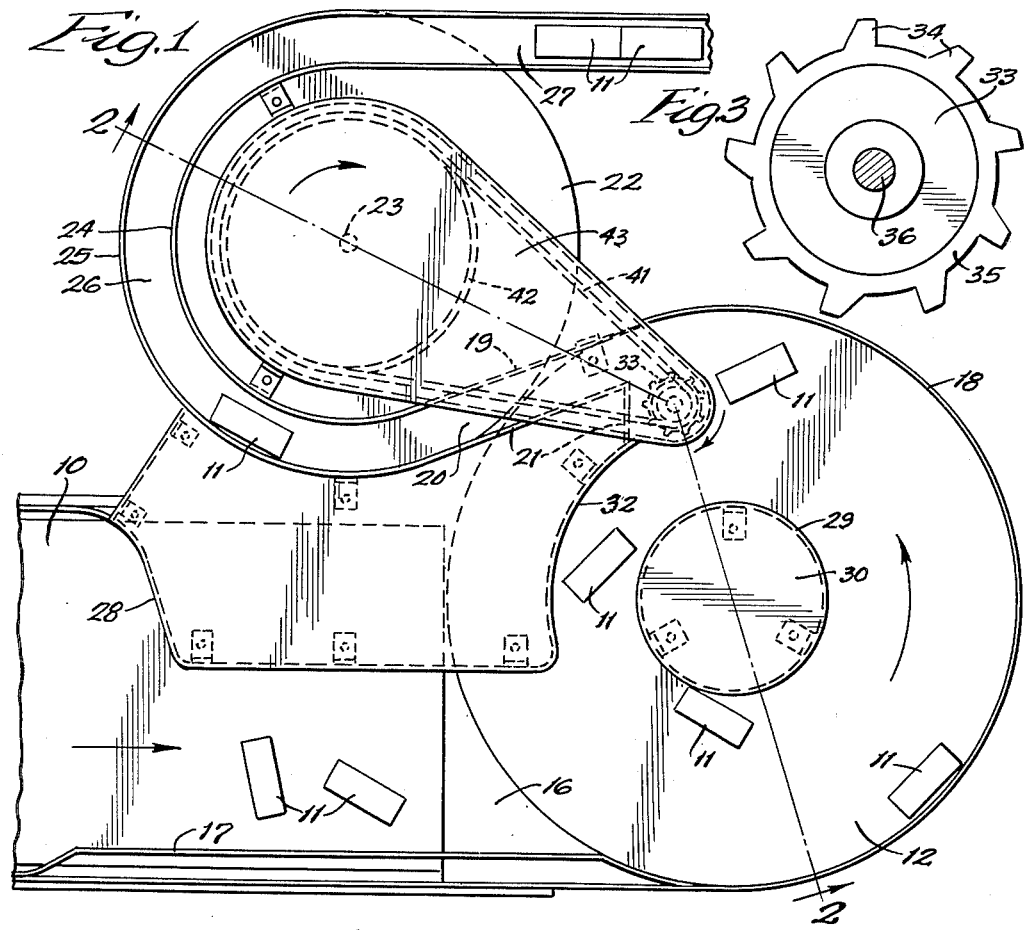
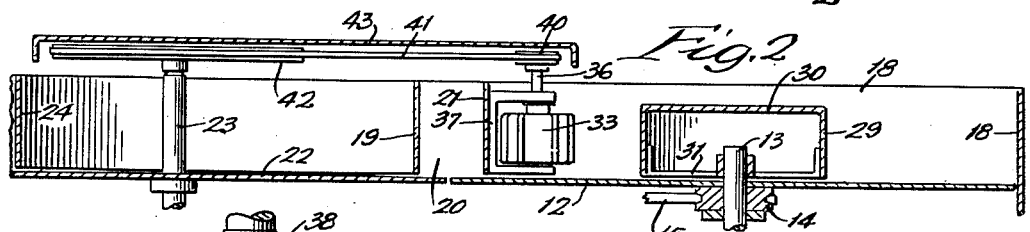
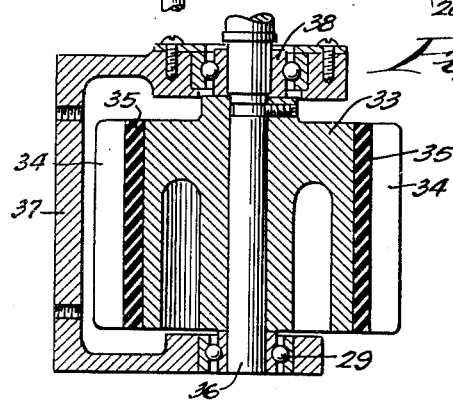
Inventors:
James Black
and Otto Hedstrom,
By Carl C. Batz
Attorney.

Patented Dec. 15, 1953

2,662,632

UNITED STATES PATENT OFFICE 2,662,632

CONTAINER-ALIGNING CONVEYER APPARATUS

James Black and Otto Hedstrom, Chicago, Ill., assignors to Armour and Company, Chicago, Ill., a corporation of Illinois Application June 25, 1948, Serial No. 35,105

3 Claims. (Cl. 198—33)

1

This invention relates to container-aligning conveyor apparatus. The invention is particularly useful in the aligning in tandem of oblong or other containers delivered by conveyor.

In the packaging of products in cylindrical cans, it has been the practice for the can-filling operators to place the filled cans upon a wide conveyor from both sides of the conveyor. The conveyor filled with cans thus extending transversely of the conveyor delivers the cans to a series of rotating disks which serve to deliver the cylindrical cans in single file upon a discharge conveyor. Such apparatus, which is called an "unscrambler," is effective with cylindrical cans. However, when the cans are oblong in shape, such as, for example, cans which are rectangular in cross section, etc., the cans tend to collect or knit together around the center of the rotating disk and form a hub which soon branches out like the spokes of a wagon wheel, producing a jam or complete obstruction to the operation. Unscrambling can apparatus as presently produced is inoperative for the unscrambling of lots of oblong cans delivered to the apparatus by a continuous conveyor.

An object of the present invention is to provide apparatus which effectively handles oblong containers or oblong or irregularly-shaped objects, delivering the objects in tandem arrangement upon a discharge conveyor. Yet another object is to provide effective apparatus for rapidly diverting and aligning oblong-shaped and other objects delivered by conveyor on which the objects are transversely arranged, while at the same time delivering the objects in single file in large volume. Yet another object is to provide simple and effective apparatus for unscrambling oblong-shaped and other types of containers or objects arranged transversely of a conveyor, while delivering the same through a tangentially-extending discharge passage guarded by a rotating member at the entrance to the discharge passage. Other specific objects and advantages will appear as the specification proceeds.

The invention is illustrated, in a single embodiment, by the accompanying drawing, in which—

Figure 1 is a broken top plan view of apparatus embodying our invention; Fig. 2, a vertical sectional view, the section being taken as indicated at line 2—2 of Fig. 1; Fig. 3, a plan view of the rotating member employed for turning the containers into lengthwise position; and Fig. 4, a vertical sectional view of the rotatably-mounted member shown in Fig. 3.

In the illustration given, 10 designates an end-

2 less conveyor belt upon which oblong containers 11 are placed transversely. A disk 12 is rotatably mounted upon shaft 13 and is equipped with a pulley 14 driven by a belt 15 leading to a power-driven pulley (not shown).

An apron 16 is provided between the end of the conveyor 10 and bridges the distance between this and the disk 12, as shown more clearly in Fig. 1. Thus the objects or containers 11, carried by the endless belt conveyor 10, slide by momentum across the apron 16 and onto the rotating disk 12. A guard or guide 17 extends along the side of the conveyor 10 and tends to direct the containers 11 toward the disk 12. A guide or guard wall 18 extends from the guard 17 about the disk 12 for a distance greater than a half circle, as shown more clearly in Fig. 1. The guide 18 at its outer end extends in a straight line at 19 to provide a substantially tangential discharge passage 20. Cooperating with the member 19 and spaced therefrom is a second guide wall 21 which extends inwardly and then laterally to enclose the inner side of the discharge passage 20, as shown more clearly in Fig. 1.

A second disk 22 is similarly mounted for rotation upon a shaft 23 driven by the motor (not shown) and has an edge abutting the edge of disk 12 just at the point where the discharge passage 20 is provided, whereby cans or other objects leaving the disk 12 through the discharge passage 20 are picked up by disk 22 and carried forwardly. The guide 19 is extended about the periphery of disk 22 and is indicated by the numeral 24. The guide wall 21 is similarly extended about the periphery of disk 22 at a spaced distance from the guide 24 and is indicated by the numeral 25. The guides 24 and 25 thus provide between them a passage 26 about the disk 22 for receiving the oblong containers or other objects 11 in single file. The guides 24 and 25 are extended in a straight line to provide a discharge passage 27 which is substantially tangential to the disk 22. The passage 27 may be simply a slide bordered by the guide rails 24 and 25 or it may be a second endless conveyor along which the containers 11 are carried to the point for packing within cartons, etc., or for other treatment.

In the carrying out of our invention, we provide a deflector plate 28 which extends over one edge portion of the conveyor 10 near the point where it communicates with the disk 12. The plate 28 has an obliquely-extending forward edge and it directs the oblong objects 11 upon one side of the rotating disk 12 at points between the center of the disk and the peripheral guide or rail 18.

In addition, we equip the disk 12 with a circular baffle 29 which extends about the center of the disk and prevents the oblong objects from collecting about the disk center. The baffle 29 may be provided with a closure top 30 and may be secured to the shaft 13 by radiating arms 31, as shown more clearly in Fig. 2. The circular baffle 29 and also the disk 12 are fixed to the shaft 13 so that they rotate together.

We prefer to have the plate or apron 28 extend partially over one side of the disk 12, as shown best in Fig. 1, and to cover the angular space formed by the guide 21, while also presenting an arcuate face 32 opposed to the circular baffle 29. There is thus provided a relatively narrow passage between the portion 32 of plate 28 and the baffle 29 through which an oblong container may return if the same should become pressed toward the center of the disk.

In the operation of the disk 12, the oblong containers 11 are for the most part drawn toward the outer rail 18 where they collect in an endwise position and thus tend to enter the narrow outlet 20 in this position. At times, however, due to the feeding of a large volume of cans, one of the cans may approach the outlet 20 with the end of the can abutting the outer rail 18. Such a can, when striking the outlet passage 20, would extend across the passage and tend to block the same. To overcome this difficulty, we provide a rotating member 33 which, in the illustration given, is in the form of a gear having laterally-extending teeth 34. The teeth 34 are covered with rubber 35, or preferably with other resilient or cushioning material, to prevent damage to the cans or other containers. The member 33, as shown more clearly in Figs. 2 and 4, is fixed to shaft 36. The shaft 36 is journaled within a U-shaped member 37 secured by bolts, welding, or other means to the guide 21. The shaft 36 is mounted upon ball bearings 38 and 39 carried by the U-shaped member 37, as shown more clearly in Fig. 4. It will be understood that other rotatable means may be provided with arms for engaging the cans or containers to cause the containers to enter the channel 20 with their sides substantially parallel with the guide wall 18 or its extension 19.

The rotatable member 33 is preferably rotated in a direction counter to that of the disk 12, as indicated by an arrow in Fig. 1. To produce this counter-rotation, the shaft 36 is equipped with a pulley 40 receiving the belt 41. The driven shaft 23 fixed to disk 22 is provided with a large pulley 42 receiving the belt 41. A guard plate 43 is preferably provided above the pulleys 42 and 40.

*Operation*

In the operation of the apparatus, the endless conveyor 10 is operated in the usual manner and passes a series of filling machines on both sides of the conveyor. The operators, as in the usual practice, place the filled cans upon the conveyor 10 and usually at points near the operators whereby the containers are roughly arranged in positions extending transversely of the conveyor. The object of the mechanism is to change the arrangement of the cans so as to bring them into single file or tandem positions.

As the containers 11 approach the end of the continuous conveyor 10, they are diverted to one side of the conveyor by means of the deflector plate 28 so that the containers are delivered upon the rotating disk 12 along one side of the disk, between the center thereof and the rail 18. At the same time, the circular baffle 29 is effective in preventing any of the containers from approaching the center of the disk. In the specific illustration given, the deflector plate 28 directs the containers so that they extend generally between the baffle 29 and the guide or rail 18. The deflector 28 and baffle 29 thus serve to concentrate the containers at points near the periphery of the disk 12 and centrifugal force imparted by the disk tends to bring the oblong members 11 into engagement with the guide rail 18 with the long sides of the containers generally parallel with the rail 18. Thus the containers 11 pass readily through the narrow outlet 20 and are carried through the passage 26 on disk 22 to the outlet passage or conveyor 27.

Should a container 11 fail to assume the position described, in which its long side is abutting the rail 18, and should it approach the outlet passage 20 in an irregular position or with its end more nearly toward the rail 18, the rotating member 33, whose teeth 34 are being moved in a direction counter to the rotation of disk 12, strikes the inner end of the container 11 and spins it so that the outer end of the container tends to rotate toward the outlet 20, and the container thus moves in an endwise direction through the outlet passage 20 and with the long side of the container toward the guide 19. In the latter operation, the counter-rotating elements 33 and 12 effect the turning of the container 11 in an extremely brief interval, the teeth 34 of member 33 moving the inner end of the container rearwardly while the disk 12 carries the outer end of the container 11 in a forward direction toward the outlet passage 20.

The foregoing structure permits the effective unscrambling of oblong objects, such as cans, other containers, and other objects of oblong or irregular shape, as well as such objects of circular shape. The deflector and circular baffle prevent knitting together of oblong objects in the center of the disk and the rotating of objects therefrom to form an obstruction. Instead, it is substantially impossible for obstructions to form, and the delivery and maintaining of the containers along the peripheral portion of the disk 12 increase the speed of the aligning operation so that the containers quickly assume their positions in which their long sides parallel or abut the rails 18. The counter-moving member 33 guards the entrance of the outlet and cooperates with the rotating disk 12 in quickly redirecting a misaligned container in an extremely brief interval before it can form an obstruction on the disk.

While in the foregoing specification, we have set forth structural elements in considerable detail for the purpose of illustrating one embodiment of the invention, it will be understood that such details of structure may be varied widely by those skilled in the art without departing from the spirit of our invention.

We claim:

1. In conveyor apparatus, a conveyor adapted to receive objects in transverse arrangement thereon, a disk supported for rotation and for receiving objects from said conveyor, a guide about peripheral portions of said disk and providing a discharge passage therefrom, said disk having an unobstructed annular portion permitting objects to be carried through a complete circle, means for rotating said disk, a baffle extending about the center of said disk, a deflector extending across one side portion of said conveyor and directing objects onto said disk between said baffle and said guide, a rotatably-mounted member having arms adjacent one side of said outlet passage, said member being spaced from said guide to provide an area adjacent the mouth of said discharge passage within which any of said objects approaching said passage long side first can be rotated by said arms into longitudinal alignment with said guide rail to enter said passage endwise, and means for rotating said member in a direction counter to that of said disk.

2. In conveyor apparatus adapted for aligning oblong containers in tandem, an endless conveyor adapted to receive oblong containers in transverse arrangement thereon, a rotatably-mounted horizontal disk adapted to receive containers from said conveyor, a guide extending about peripheral portions of said disk and providing a tangential discharge passage therefrom, a deflector across a portion of said conveyor and directing containers therefrom onto one side of said disk between the center thereof and said guide, a circular baffle extending about the center of said disk, a second disk supported for rotary movement and arranged to receive containers from said first disk through said discharge passage, means for rotating said disks, said first-mentioned disk having a free annular portion to permit the return of objects failing to enter said discharge passage, a rotary guard member equipped with arms extending to a point adjacent the inner side of said outlet passage, said member being spaced from said guide to provide an area adjacent the mouth of said discharge passage within which any of said objects approaching said passage long side first can be rotated by said arms into longitudinal alignment with said guide rail to enter said passage endwise, means for rotating said rotary member in a direction counter to that of said first-mentioned disk, and arcuate guides extending about said second disk for conveying said containers in tandem thereon to a discharge passage.

3. In a conveyor apparatus, a conveyor adapted to receive objects in transverse arrangement thereon, a disk supported for rotation and for receiving objects from said conveyor, a guide about peripheral portions of said disk and providing a discharge passage therefrom, means for rotating said disk in one direction, a baffle extending about the center of said disk, said disk having an unobstructed annular portion between said guide and said baffle permitting objects to be carried through a complete circle, means for directing objects onto said disk between said baffle and said guide, a rotatably mounted member adjacent said outlet passage adapted to engage said objects, and means for rotating said member in a disk counter to that of said disk.

JAMES BLACK.
OTTO HEDSTROM.

References Cited in the file of this patent

UNITED STATES PATENTS

| Number | Name | Date |
|---|---|---|
| 971,999 | Hodge | Oct. 4, 1910 |
| 1,115,003 | Nichols | Oct. 27, 1914 |
| 1,284,638 | Foss | Nov. 12, 1918 |
| 1,510,097 | Miller | Sept. 30, 1924 |
| 2,047,106 | Lidberg et al. | July 7, 1936 |
| 2,176,659 | Mundy | Oct. 17, 1939 |
| 2,268,897 | Price | Jan. 6, 1942 |
| 2,280,522 | Hahn | Apr. 21, 1942 |
| 2,389,496 | Gagnon et al. | Nov. 20, 1945 |
| 2,524,248 | Albertoli | Oct. 3, 1950 |